April 16, 1963 R. E. POWERS 3,086,179

TRANSMISSION REGULATOR UTILIZING PASSIVE VARIABLE-LOSSER WHICH IS CONTROLLED, VIA CIRCUIT HAVING EXPANSION NETWORK, BY SIGNAL LEVEL

Filed May 9, 1960

INVENTOR
R. E. POWERS

BY R. B. Ardis

ATTORNEY 3,086,179
Patented Apr. 16, 1963

3,086,179

TRANSMISSION REGULATOR UTILIZING PASSIVE VARIABLE-LOSSER WHICH IS CONTROLLED, VIA CIRCUIT HAVING EXPANSION NETWORK, BY SIGNAL LEVEL

Robert E. Powers, North Andover, Mass., assignor to Bell Telephone Laboratories, Incorporated, New York, N.Y., a corporation of New York Filed May 9, 1960, Ser. No. 27,743
7 Claims. (Cl. 333—14)

Figure 1:
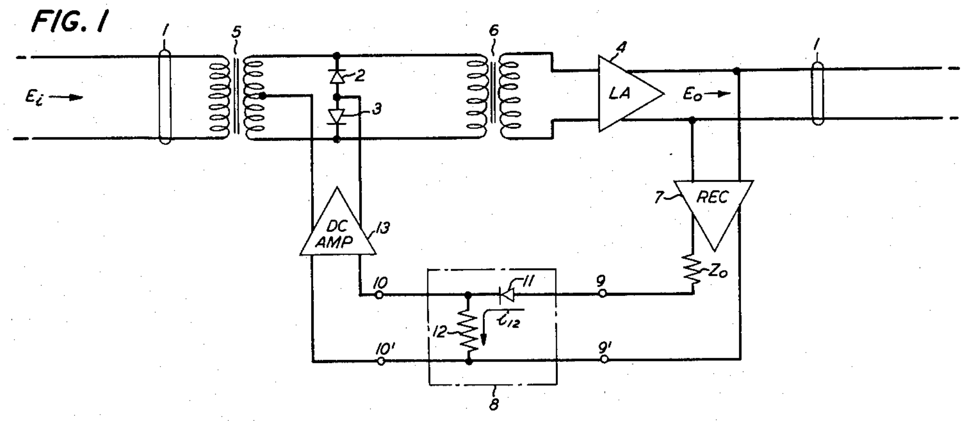

This invention relates to gain control apparatus and more particularly, although in its broader aspects not exclusively, to circuit arrangements operable to suppress variations in the level of energy propagating in a transmission medium.

A transmission regulator may be defined as a device operative to suppress variations in the level of energy propagating in a transmission medium. Generally speaking, such regulators include control circuitry capable of both detecting variations in a particular attribute of energy propagating in a medium, magnitude for example, and applying a signal representative of those variations to a transducer which responsively alters transmission characteristics of the medium. Such an alteration may, for example, take the form of a variation in impedance level exhibited by the medium. One of the many types of circuits which function in conformity with the principles described above is a backward acting variolosser regulator.

If a transmission regulator includes apparatus characterized by a transfer function indicative of expansion, that is to say, the percent variation of a response at a set of output terminals of the apparatus is greater than the percent variation of a control impetus applied at a corresponding set of input terminals, regulation is thereby improved. Based on this phenomenon, most present day regulators do include expansion apparatus. Generally, however, such regulators include only one device operative to create expansion, this device often being inserted in the transmission medium. In a backward acting variolosser regulator, for example, expansion of a detected control signal in which a variation occurs is frequently provided by one or more semiconductor diodes which are normally bridged across the regulated medium. These diodes comprise one form of what may be termed a transmission loss transducer, a signal controlled device for selectively inserting varying amounts of loss in a transmission medium. Variations in a control signal applied to the transducer are expanded in terms of transmission loss presented to energy propagating in the medium. As will subsequently be shown, an index of the available expansion of such a device, and hence the degree of regulation provided to the medium, is governed, to a large extent, by the magnitude of the exponent of the voltage current relationship exhibited by the diodes comprising the transducer.

Presently available semiconductor diodes, energized by suitable biasing means, are characterized by voltage-current curves which, under substantially ideal conditions, have exponents varying numerically between the limits of 20 and 30. In a typical circuit configuration, however, due to certain parameters unavoidably present in the circuit, the effective exponent may be decreased considerably in value from that which is ideally available. Resistance, for example, connected in series with a semiconductor diode has the adverse effect of decreasing the production of available control voltage which is applied across a diode. Thus, expansion of such a control signal in terms of loss, and hence the effective value of the exponent, is thereby degraded. In terms of numbers, semiconductor diodes which have curves ideally characterized by exponents in the 20 to 30 range may, when inserted in typical variolosser regulator arrangements exhibit effective exponents of from only 10 to 15.

Regulator arrangements characterized by decreased indices of expansion do provide sufficient regulation in certain applications. In operator controlled long distance telephone systems, for example, only one toll link (the transmission facilities between two central switching terminals) is generally required to interconnect two subscribers' telephones. Since an individual toll link is usually characterized by a relatively small quantity of transmission loss, a regulator having a decreased index of expansion may be tolerated. In the event that more than one toll link is required to complete a talking path between subscribers, thereby possibly incurring cumulative loss, an operator is available to manually inspect the quality of transmission provided by the path before connection, and discard an unsatisfactory path in lieu of one displaying higher qualities. There are, nevertheless, systems for which a much higher degree of regulation is required. With the advent of direct distance dialing systems, as one illustration, a plurality of toll links are automatically selected and tandemly connected to provide a talking path between distant subscribers. Transmission loss through each individual link is cumulative with loss through the remaining links, and, due to system automation, no operator is available to test and discard low quality connections. Since a transmission loss as slight as 2 db over a talking path may render reception of a conversation unduly objectionable, an extremely high degree of regulation is almost indispensable in severe situations. If in addition, terminal regulation, i.e., regulation of transmission loss at a main terminal rather than at a plurality of repeaters distributed along the line, is to be employed, the problem of increasing the degree of available regulation becomes particularly critical.

Accordingly, it is an important object of this invention to enhance the degree of suppression of variations in energy propagating in a transmission medium by increasing the realizable expansion present in regulator apparatus.

It is another object of this invention to increase the degree of expansion present in regulator apparatus by utilization of a minimum of additional passive circuit elements.

It is a more particular object of this invention to expand a signal representative of deviations in the level of energy propagating in a transmission medium in accordance with the product of the exponents of a plurality of nonlinear signal translating elements.

According to the invention in one of its principal aspects, signals representative of sensed variations in the level of energy propagating through a transmission medium are expanded by a suitable arrangement of passive circuit elements before being applied to transducer apparatus operative to correctively alter particular transmission characteristics associated with the medium.

In an important feature of the invention a network arrangement of passive circuit elements is utilized to expand a particular characteristic of signals appearing in the control path of a transmission regulator.

One embodiment of such a network, to which the invention is in no way restricted, assumes a T configuration having an input terminal at one end of the cross member, an output terminal at the end of the cross member, and a terminal common to both input and output situated at the base of the stem. Connected in the cross member between input terminal and stem is a nonlinear transmission element having its impedance in the direction of transmission substantially greater than the resistance of a resistor which is in series with the stem. If the characteristic to be expanded by this network is voltage or, stated differently, if the percent variation of a response at a set of output terminals of the network is to be greater than the percent variation in voltage of a signal applied at a corresponding set of input terminals, the nonlinear transmission element is characterized by a transfer function whereby current through the network rises substantially exponentially with respect to applied voltage, the numerical value of the exponent being greater than unity.

The expansion property of such a network in terms of voltage response is best illustrated by the following analysis. The transfer function of the network, since the impedance in the direction of transmission of the nonlinear element is substantially greater than the resistance of the resistor, is essentially expressed:

$$I=aV^n \qquad (1)$$

where V and I are, respectively, the voltage impressed across and the current flowing into the network, $a$ is a constant and $n$ is the exponent of the nonlinear element. Upon transformation into natural logarithmic form and differentiation of both sides of Equation 1, it becomes explicit in Equation 2 that a voltage variation applied across the network is expanded in terms of current flowing through the network by a factor equal to the exponent of the nonlinear element.

$$\frac{dI}{I}=n\frac{dV}{V} \qquad (2)$$

Since the response of the network is extracted across the resistor, expansion in terms of current response manifests itself as expansion in terms of voltage response. It is to be understood that the particular network embodiment described heretofore is only by way of example of an appropriate device for use in a regulator in accordance with the invention, it being apparent to one skilled in the art that many similar passive networks which expand a control signal in terms of a response suitable for application to a loss transducer are within the scope and spirit of the invention.

Figure 2:
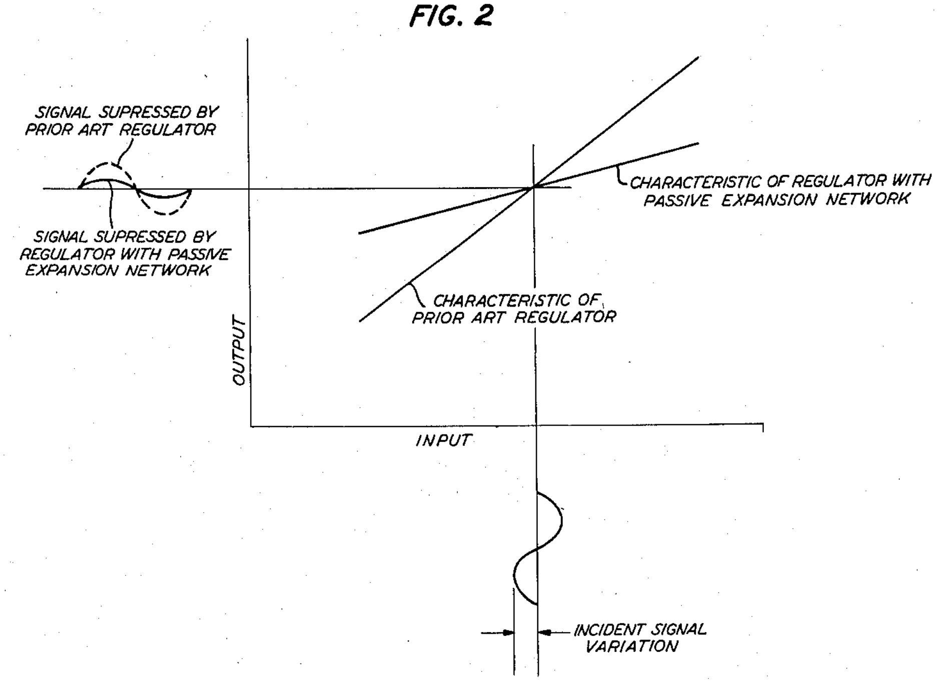

The foregoing and other features and objects of the invention will be more thoroughly understood by reference to the following detailed description and drawing of which:

FIG. 1 depicts one illustrative regulator arrangement embodying the principles of the invention; and FIG. 2 illustrates in graphical form the enhanced performance offered by a regulator constructed in accordance with the invention.

With reference to FIG. 1 of the drawing, regulator apparatus in accordance with the principles of the invention is shown connected to a transmission medium 1 which may, for example, be a carrier telephone line. A loss transducer comprising variolosser diodes 2 and 3, connected in back-to-back configuration, is bridged across the medium, while a repeater, shown in block diagram form as line amplifier 4, is serially connected in the medium. Variolosser diodes, such as 2 and 3, may, for purposes of this specification, be defined as transmission elements having their impedances to alternating energy vary in accordance with the direct-current component of energy which they translate. To facilitate the application of both bias potential and control signals to the transducer, diodes 2 and 3 are connected in a section of the medium embraced by transformers 5 and 6. It is apparent to one skilled in the art, however, that if a bridge configuration of variolosser diodes is utilized rather than the arrangement shown in the drawing, bias and control signals may conveniently be applied to the vertices which are not connected to the medium, thereby eliminating the necessity of transformers 5 and 6. Coupled to the medium on the output side of line amplifier 4 is a rectifying device 7 which, for example, may include a conventional four-diode bridge rectifier and a direct-current amplifier. It is preferable, since series resistance degrades the expansion properties of a diode, that the output impedance $Z_o$ of rectifying device 7 be as small as possible.

Connected to the output of rectifying device 7 is one embodiment of a passive expansion network, shown generally at 8, constructed in accordance with the principles of the invention. Network 8, as depicted in the drawing, is a four-pole arrangement comprising a diode 11 having its cathode terminal connected to a resistor 12, a pair of input terminals 9—9' bridged across the combination, and a pair of output terminals 10—10' connected across resistor 12. Diode 11, which may, for example, be of conventional silicon alloy composition, is a device having an exponential current-voltage characteristic curve, and is poled in the forward direction to current applied by rectifying device 7 to input terminals 9—9'. In accordance with the invention, diode 11 is biased such that its forward impedance is substantially larger than the resistance of resistor 12, the difference exceeding, for example, several hundred ohms. Output terminals 10—10' of passive expansion network 8 are connected to the loss transducer through direct-current amplifier 13, thereby completing a closed loop path back to medium 1. As shown in FIG. 1, bias and control signals operative to energize diodes 2 and 3 are applied to the transducer by connecting one output terminal of amplifier 13 to a tap in the secondary winding of transformer 5, while the other output terminal is connected to the junction between the diodes.

For purposes of best illustrating the superiority of a regulator constructed in accordance with the principles of the invention over regulators previously available, assume, as a typical prior art regulator, apparatus including a transmission medium, a repeater connected in the medium, and a control circuit having its input terminals coupled to one side of the repeater. A transmission loss transducer is connected in the medium on the other side of the repeater and functions in response to signals detected by the control circuitry. Assume further that the transducer is characterized by expansion or in equation form:

$$\frac{\Delta L}{L}=\frac{F\Delta e_c}{e_c} \qquad (3)$$

where L is the transducer's response in terms of transmission loss inserted in the medium, $e_c$ is a control impetus, and F is an index of the expansion property of the transducer. By integrating Equation 3, the loss created by the transducer, as expressed in terms of its control signal, is seen to be $$L=C(e_c)^F \qquad (4)$$

where C is a constant of integration.

Energy flowing through the transmission medium and incident with a magnitude $E_i$ upon the transducer-repeater combination emerges with a magnitude $E_o$. A portion of this energy is sensed by the control circuitry and applied to the transducer. The relationship established between $E_i$ and $E_o$ can then be expressed:

$$E_o=LK_1E_i=C(E_oK_2)^FK_1E_i \qquad (5)$$

where $K_1$ and $K_2$, respectively, are the gains of the repeater and the control circuitry. With its terms rearranged and constant terms combined Equation 5 can be expressed:

$$E_o=C_1(E_i)^{\frac{1}{1-F}} \qquad (6)$$

To eliminate the constant $C_1$, two expressions, each comprising a distinct corresponding pair of values of $E_i$ and $E_o$ ($E_{i1}$, $E_{o1}$ and $E_{i2}$, $E_{o2}$, respectively) are substituted in Equation 6 and divided by each other, the resulting quotient being:

$$\frac{E_{o2}}{E_{o1}}=\left[\frac{E_{i2}}{E_{i1}}\right]^{\frac{1}{1-F}} \qquad (7)$$

or, transformed into decibel notation:

$$\Delta db(E_o)=\frac{\Delta db(E_1)}{1-F} \quad (8)$$

It is explicit from Equation 8 that variations in the level of energy incident upon the regulator are suppressed in substantially direct proportion to the amount of expansion exhibited by the transducer.

Consider the arrangement described above to be that illustrated in FIG. 1, except that passive expansion network 8 is eliminated from the circuit and terminals 9—9′ are joined directly to terminals 10—10′. Impedance exhibited by diodes 2 and 3 to alternating energy propagating in the medium, and hence transmission loss, varies in accordance with the well-known relationship:

$$L\approx r\approx V^{(1-n)} \quad (9)$$

where V is the voltage applied across a diode, $r$ is the impedance exhibited by a diode to alternating energy, and $n$ is the exponent of a diode. It is readily observable that the right-hand terms of Equations 4 and 9 are of the same form, that is to say, the index of expansion of the transducer, F, as set forth in Equation 4, is equivalent to the quantity $(1-n)$ of Equation 9. In accordance with Equations 8 and 9, therefore, the index of expansion, and hence the degree of regulation of such a prior art variolosser regulator, is governed, to a large extent, by the magnitude of the exponent exhibited by the varistors comprising the transducer.

According to the invention, increased suppression of relative deviations in energy translated through a regulator is attained by inserting a network in the regulator control path which provides expansion in addition to that supplied by the diodes connected in the transmission medium. The configuration shown generally at 8 is one example of a network operative in accordance with the principles of the invention which in addition, due to its composition of only passive elements, features both high stability and relative insensitivity to component aging.

In operation, when $E_o$ resides at its normal magnitude, rectifying device 7 is adjusted to apply at terminals 9—9′ a bias signal to which the forward impedance exhibited by diode 11 appears substantially greater in value than the resistance of resistor 12. If, as one illustration, diode 11 is of a silicon alloy variety, such as the Western Electric type 420 diode, a bias current of 1 milliampere induces a voltage drop of approximately 0.65 volt across the diode. Diode 11, under these initial conditions, exhibits an impedance of approximately 650 ohms. The resistance of resistor 12, on the other hand, is relatively small, for example, 10 ohms.

If $E_o$ deviates from its normal magnitude, the voltage across terminals 9—9′ of network 8 is proportionately varied. Due to the relative magnitude of the impedance of diode 11 compared to that of resistor 12, the voltage variation across diode 11 is substantially equal to that across terminals 9—9′. In accordance with Equation 2, therefore, the voltage variation across terminals 9—9′ is expanded in terms of current through resistor 12. The expansion in terms of the current through resistor 12 manifests itself as expansion in terms of voltage across terminals 10—10′. After translation through amplifier 13, this expanded voltage is even further expanded in terms of loss in accordance with Equation 4, thereby affording increased regulation to medium 1.

Illustrated in FIG. 2 are several waveforms which graphically describe the relative improvement in performance of regulators characterized in their control paths by the addition of passive expansion networks. Two characteristic curves are shown in the figure each describing regulator output energy level as a function of input energy level. One of the curves, as labeled, represents the performance of a regulator not including an expansion network, while the other represents the performance of a regulator into which, in accordance with the invention, such a network has been inserted. As is readily observable from the superimposed output waveforms, regulators constructed in accordance with the invention suppress variations in input energy level to a greater extent, and yield a system with greater stiffness than do those of the prior art.

To aid in a more thorough quantitative understanding of the improvement in regulation afforded by the invention, a brief analysis is presented of the operation of the circuit illustrated in the drawing. From Equation 4 the following relationship is derived:

$$L=a(e_{13})^{F} \quad (10)$$

where $e_{13}$ is the signal emitted by amplifier 13 and $a$ is a constant. It is easily seen, however, that $$e_{13}=i_{12}R_{12}K_{13}=(K_7e_o)^{F'}R_{12}K_{13} \quad (11)$$

where $K_{13}$ and $K_7$, respectively, are the gains of amplifier 13 and rectifying device 7, $R_{12}$ is the resistance of resistor 12, $e_o$ is the voltage appearing at the output of line amplifier 4, and F′ is an index of expansion of network 8. Substituting in Equations 10 and 11 and combining constants:

$$L=C(e_o)^{FF'} \quad (12)$$

It is apparent from Equations 4 and 8, therefore, that by adding an expansion network to a regulator circuit in conformity with the principles of the invention, the overall index of expansion of the arrangement, and hence the "stiffness" of the regulated transmission medium, is increased by a factor equal to the individual index of expansion of the added network.

While only one illustrative embodiment of the invention has been described herein, it should be apparent to one skilled in the art that many arrangements of components may be devised without departing from the spirit and scope of the invention.

What is claimed is:

1. Apparatus for regulating the level of wave energy propagating in a transmission medium comprising in combination, a rectifier, a first expansion network and a second expansion network intercoupling said rectifier and said first expansion network, amplifying means electrically interconnecting said first and second expansion networks, said second expansion network comprising a diode connected to a resistor, the resistance of said resistor being substantially smaller than the forward impedance exhibited by said diode, and input terminals for said amplifying means, said resistor being connected across said input terminals.

2. Apparatus for regulating the output energy level of a wave transmission device comprising a transmission circuit having input and output terminals, circuit means coupled to said input terminals of said transmission circuit for dissipating controllable quantities of energy in accordance with an electrical signal, an amplifier connected to said circuit means, input means for said amplifier, means for detecting at least a portion of the energy appearing at said output terminals of said transmission device and a network intercoupling said detecting means and said amplifier comprising a resistor and a diode, the internal impedance of said diode in the direction of translation being substantially larger than the resistance of said resistor, and said resistor being connected in shunt with the input terminals of said amplifier.

3. A wave transmission regulator comprising a wave energy translator, an input circuit for said translator, at least one diode connected in said input circuit operable to dissipate controllable quantities of energy in accordance with a biasing signal, an amplifier connected to said diode, said amplifier including a pair of input terminals, an output circuit for said translator, a rectifier coupled to said output circuit, and a passive network for providing said biasing signal intercoupling said rectifier and said amplifier, said network comprising a diode exhibiting a predeterminable forward impedance and a resistor having a resistance substantially smaller than said forward impedance, and said resistor being connected across said input terminals.

4. A transmission regulator comprising a wave energy translating device, an input circuit, at least one variolosser diode capable of having its impedance selectively controlled connected in parallel relation with said input circuit, an amplifier connected to said diode, a pair of input terminals included in said amplifier, an output circuit for said translating device, a rectifier connected in said output circuit operable to sense a portion of translated wave energy, a control diode intercoupling said rectifier and said amplifier, and a circuit element connected to said control diode and across said input terminals operable to permit a portion of wave energy to be substantially expanded by said control diode, said circuit element exhibiting an impedance substantially smaller than the forward impedance of said control diode.

5. A transmission regulator in accordance with claim 4 wherein said circuit element is a resistor having a resistance substantially smaller than the forward internal impedance of said control diode.

6. A transmission regulator comprising a wave energy translating device having an input circuit and an output circuit, a pair of variolosser diodes connected in back-to-back relation across said input circuit, control means including an amplifier connected to apply energy to said variolosser diodes, a pair of input terminals included in said amplifier, a four terminal network including a diode and a resistor combined in series, a first pair of terminals of said network being connected solely across said resistor, and a second pair of terminals of said network being connected across said serially combined diode and resistor, the resistance of said resistor being substantially smaller than the forward impedance exhibited by said diode, and detector means including a rectifier circuit connected to sense energy propagating from said output circuit, said rectifier circuit being connected to apply at least a portion of said sensed energy to said second pair of terminals, and said first pair of terminals being connected to said input terminals of said amplifier.

7. A device for suppressing variations in the level of wave energy propagating in a transmission medium comprising, in combination, a first expansion network connected in said medium, detecting means for sensing energy propagating through said medium, a second expansion network connected to said detecting means, and an amplifier intercoupling said first and second expansion networks, said amplifier including a pair of input terminals, and said second expansion network comprising a resistor and a variable impedance element having a nonlinear operating characteristic, the resistance of said resistor being substantially smaller than the impedance exhibited by said variable impedance element throughout a substantial portion of said nonlinear characteristic, and said resistor being connected across said input terminals.

References Cited in the file of this patent

UNITED STATES PATENTS

| | | |
|---|---|---|
| 2,199,190 | Shore | Apr. 30, 1940 |
| 2,281,312 | Krist | Apr. 28, 1942 |
| 2,920,291 | Brundage | Jan. 5, 1960 |
| 2,995,706 | Clarridge | Aug. 8, 1961 |

FOREIGN PATENTS

| | | |
|---|---|---|
| 804,802 | Great Britain | Nov. 26, 1958 |